United States Patent [19]

Langenbrunner et al.

[11] Patent Number: 5,344,280

[45] Date of Patent: Sep. 6, 1994

[54] IMPACT RESISTANT FAN CASE LINER

[75] Inventors: Leslie L. Langenbrunner, Cincinnati; Richard T. Price, Loveland; Jack W. Baldwin, West Chester, all of Ohio

[73] Assignee: General Electric Company, Cincinnati, Ohio

[21] Appl. No.: 58,643

[22] Filed: May 5, 1993

[51] Int. Cl.$^5$ ............................................. F01D 21/00
[52] U.S. Cl. ..................................... 415/9; 415/119; 415/200; 428/116; 428/218
[58] Field of Search ............... 415/9, 119, 200, 197; 416/229 A, 230; 428/116, 117, 118, 73, 218; 156/292, 327

[56] References Cited

U.S. PATENT DOCUMENTS

| | | |
|---|---|---|
| 3,806,928 | 4/1974 | Costanza ............... 428/118 |
| 4,000,956 | 1/1977 | Carlson et al. . |
| 4,043,703 | 8/1977 | Carlson . |
| 4,071,184 | 1/1978 | Carlson et al. . |
| 4,235,303 | 11/1980 | Dhoore et al. ............... 428/116 |
| 4,421,811 | 12/1983 | Rose et al. ............... 156/327 |
| 4,534,698 | 8/1985 | Tomich ............... 415/9 |
| 4,954,382 | 9/1990 | Riefler et al. ............... 428/116 |
| 5,141,400 | 8/1992 | Murphy et al. ............... 416/229 A |
| 5,151,311 | 9/1992 | Parente et al. ............... 428/116 |
| 5,160,248 | 11/1992 | Clarke . |

OTHER PUBLICATIONS

"The Relation Between Graphite Composite Toughness and Matrix Shear Stress–Strain Properties", by Raymond B. Krieger, Jr., American Cyanamid Company, Engineered Materials Department, Havre de Grace, Md. 21078.

"Advances in Toughness of Structural Composites Based on Interleaf Technology", by Raymond B. Krieger, Jr., American Cyanamid Company, Engineered Materials Department, Havre de Grace, Md. 21078.

"Three Examples of Adhesive Interleaf Reducing Stress Concentrations in Structural Composites", Raymond B. Krieger, American Cyanamid Co., Old Post Road, Havre de Grace, Md. 21078 U.S.A.

"An Adhesive Interleaf to Reduce Stress Concentrations Between Plys of Structural Composites", Raymond B. Krieger, Jr., Mgr., New Developments, Adhesives, American Cyanamid Co., Engineered Materials Dept., Old Post Rd., Havre de Grace, Md. 21078.

Primary Examiner—Edward K. Look
Assistant Examiner—James A. Larson
Attorney, Agent, or Firm—Jerome C. Squillaro; Nathan D. Herkamp

[57] ABSTRACT

A composite article includes a plurality of laminates each having structural fibers bonded in a matrix, and an adhesive film disposed between and bonding together adjacent ones of the laminates. In an exemplary embodiment, the laminates and the interleaved adhesive films form a facesheet which is joined to a core for forming an impact resistant fan case impact liner for a gas turbine engine. The impact liner may be integrated with a sound suppression liner.

8 Claims, 4 Drawing Sheets

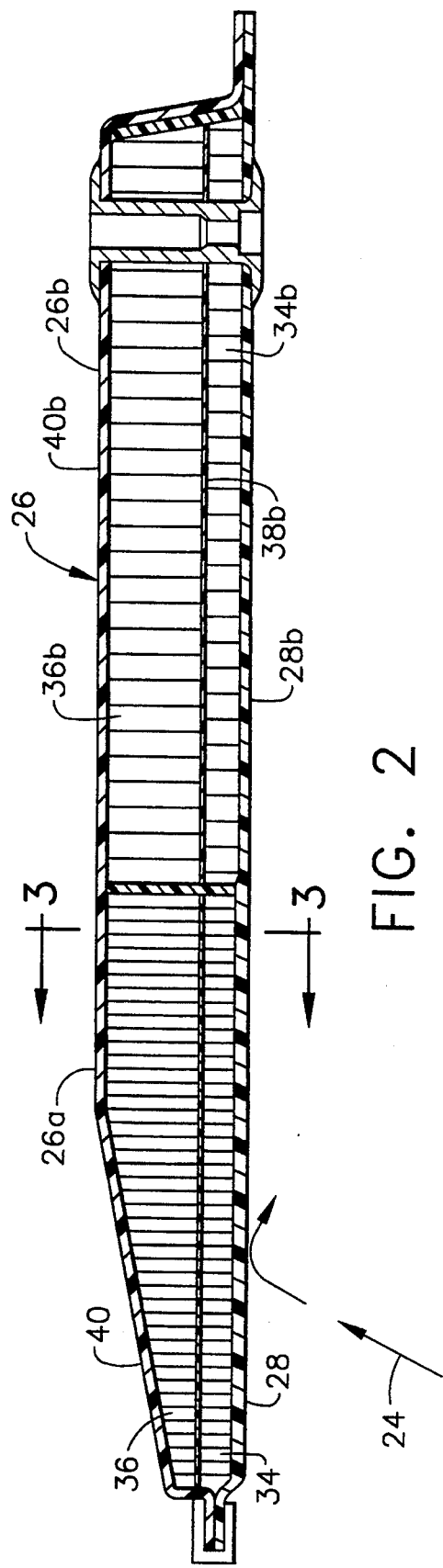
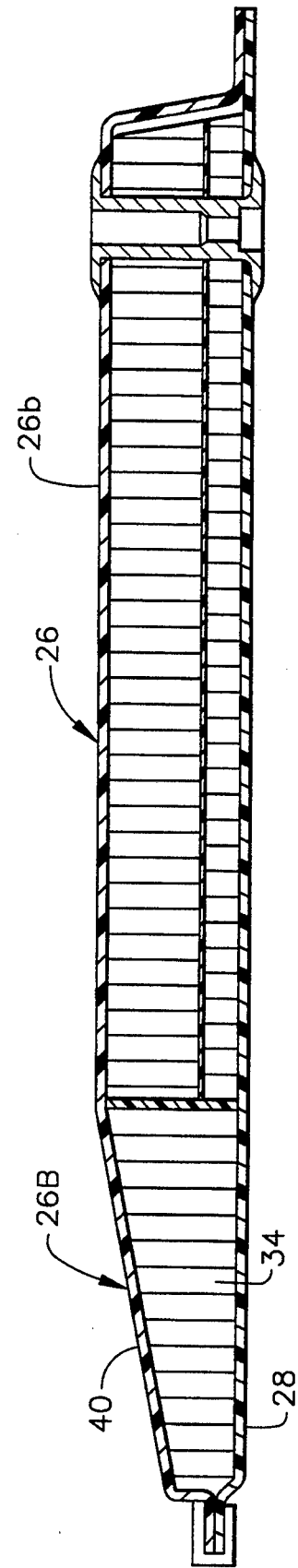

5,344,280

IMPACT RESISTANT FAN CASE LINER

IMPACT RESISTANT ARTICLE

The present invention relates generally to gas turbine engines, and, more specifically, to a composite article within the fan region thereof having improved impact resistance from foreign objects such as ice.

BACKGROUND OF THE INVENTION

In a gas turbofan jet engine powering an aircraft in flight, certain environmental conditions cause ice formation on the rotating fan blades and adjacent rotating components during engine operation. When this ice sheds, it is thrown radially outwardly and aft by the fan blades due to centrifugal force and impinges against the annular outer liners facing radially inwardly from the fan case. Accordingly, the fan case liners in this region of the engine are specifically configured for having increased strength for better resisting impact from the ice.

Since the turbofan engine powers an aircraft in flight, the weight of the fan case liner is a significant factor affecting the overall weight of the engine and efficiency of operation of the aircraft. Accordingly, it is difficult to make an effective impact resistant fan case liner that is also lightweight. For the ever increasing size of modern aircraft turbofan engines with increasing diameter fans therein, the diameter of the fan case liner correspondingly increases which in turn increases its weight even further, with the weight thereof becoming even more significant in obtaining efficient operation of the aircraft.

Furthermore, the impact resistant liner is typically integrated into a conventional honeycomb sandwich construction, sound suppression liner which similarly attaches into the fan case that surrounds the fan. The impact resistant liner must therefore be structurally compatible with the sound suppression liner while still maintaining effective impact resistance with as little weight as possible.

In U.S. Pat. No. 5,160,248 by J. P. Clarke, entitled "Fan Case Liner for a Gas Turbine Engine With Improved Foreign Body Impact Resistance," assigned to the present assignee, several embodiments of an improved fan case liner having integrated portions for impact resistance and sound suppression are disclosed. The integrated liner includes a multi-ply facesheet supported by one or more honeycomb cores and surrounded by a backsheet. The facesheet includes multiple plies of fiberglass or the like impregnated with an epoxy resin and cured for forming an impact resistant material. The face sheet is joined to a honeycomb layer of aluminum, for example, by a fiber-reinforced adhesive. In the preferred embodiment disclosed by Clarke, a second honeycomb layer, also being aluminum for example, is attached to the first honeycomb layer and has a compressive strength greater than the compressive strength of the first honeycomb layer for improved distribution of foreign body impact forces and to resist plastic deformation of the liner. The higher the compressive strength of the honeycomb layer, the denser the honeycomb required, which increases weight of the liner.

Although the fan case liner disclosed by Clarke has improved impact resistance capability, the resulting facesheet itself is nevertheless subject to damage since it has a relatively low ductility epoxy matrix. Its combination with the supporting honeycomb layers, however, provides an effective composite article for accommodating impact loads from the foreign objects.

SUMMARY OF THE INVENTION

A composite article includes a plurality of laminates each having structural fibers bonded in a matrix, and an adhesive film disposed between and bonding together adjacent ones of the laminates. In an exemplary embodiment, the laminates and the interleaved adhesive films form a facesheet which is joined to a core for forming an impact resistant fan case impact liner for a gas turbine engine. The impact liner may be integrated with a sound suppression liner.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is an enlarged axial sectional view of the fan case liner illustrated in FIG. 1 in accordance with a first embodiment of the present invention having an integrated impact resistant liner and a sound suppression liner.

FIG. 6 is a sectional view of a fan case liner similar to FIG. 2 in accordance with another embodiment of the present invention.

DESCRIPTION OF THE PREFERRED EMBODIMENT(S)

Figure 1:
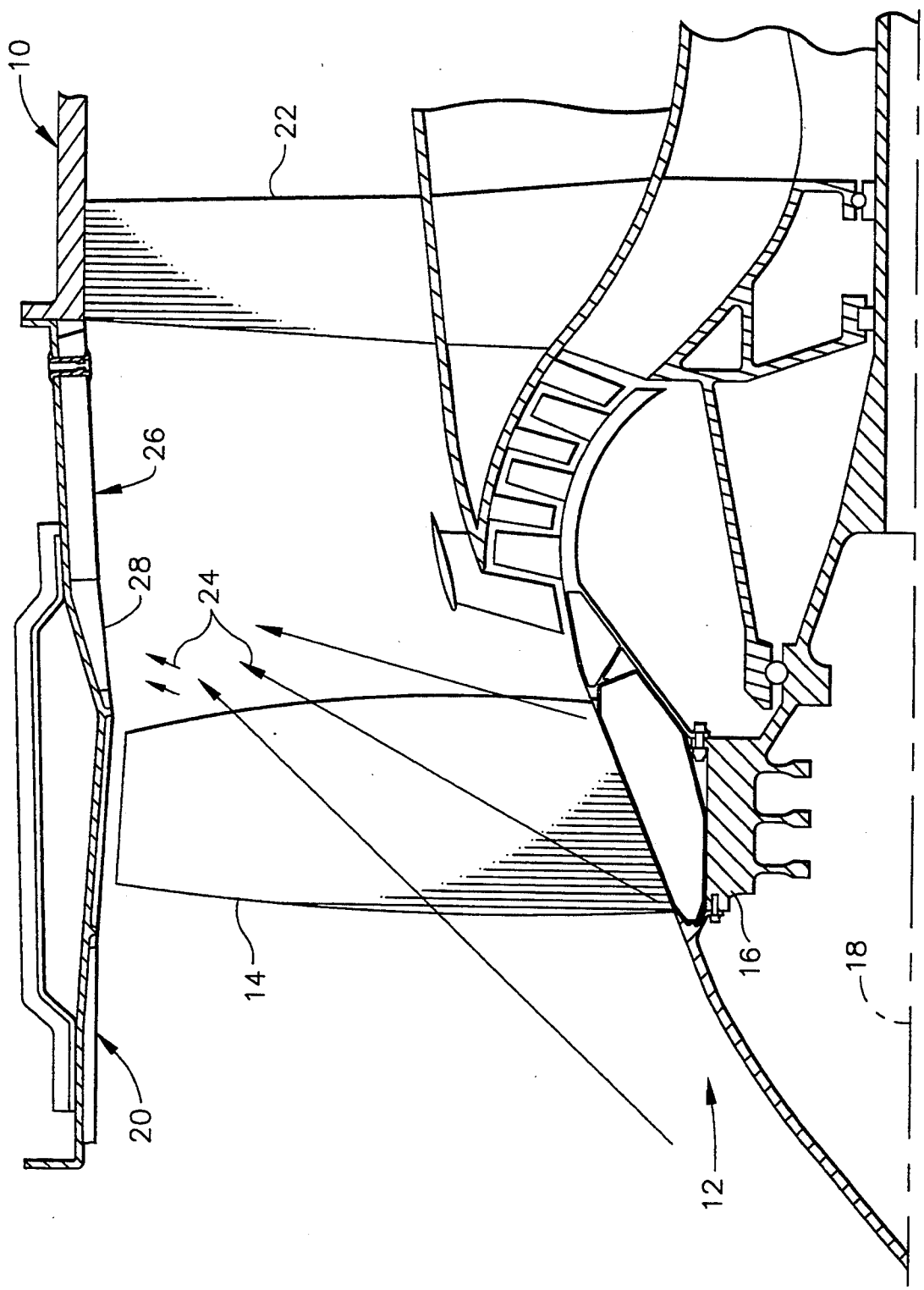
FIG. 1 is a partly sectional, schematic view longitudinally through a portion of a gas turbine engine fan disposed inside an annular fan case having an improved fan case liner in accordance with one embodiment of the present invention.

Illustrated schematically in FIG. 1 is a portion of an aircraft gas turbofan engine 10 effective for powering an aircraft (not shown) in flight. The engine 10 includes a conventional fan 12 having a plurality of circumferentially spaced apart fan blades 14 extending radially outwardly from a supporting rotor disk 16 about a longitudinal or axial centerline axis 18. Circumferentially surrounding the fan 12 is an annular fan case 20 supported by a plurality of circumferentially spaced apart stationary fan struts 22 as is conventionally known. During operation of the engine 10, foreign objects as represented by the trajectory arrows 24, which include ice for example, may be shed or hurled by the rotating fan blades 14 both radially outwardly and in an aft or downstream direction against the inside surface of the fan case 20. In order to protect the fan case 20 from damage by the objects 24, an improved annular fan case liner 26 in accordance with one embodiment of the present invention is provided. The fan case liner 26 is conventionally joined in the fan case 20 and extends downstream from the blades 14 to adjacent the fan struts 22 in the region subject to the objects 24.

A portion of the fan case liner 26 in accordance with a first embodiment of the present invention is illustrated in more particularity in FIG. 2. In the preferred embodiment, the fan case liner 26 includes both an upstream or forward impact resistant liner or portion 26a in accordance with a first embodiment of the present invention, and an integral sound suppression liner or portion 26b disposed downstream or aft therefrom. Whereas the sound suppression liner 26b has a conventional configuration for suitably suppressing sound generated by the operating fan 12, the impact liner 26a is configured and formed in accordance with the present invention for having improved impact resistance.

Figure 3:
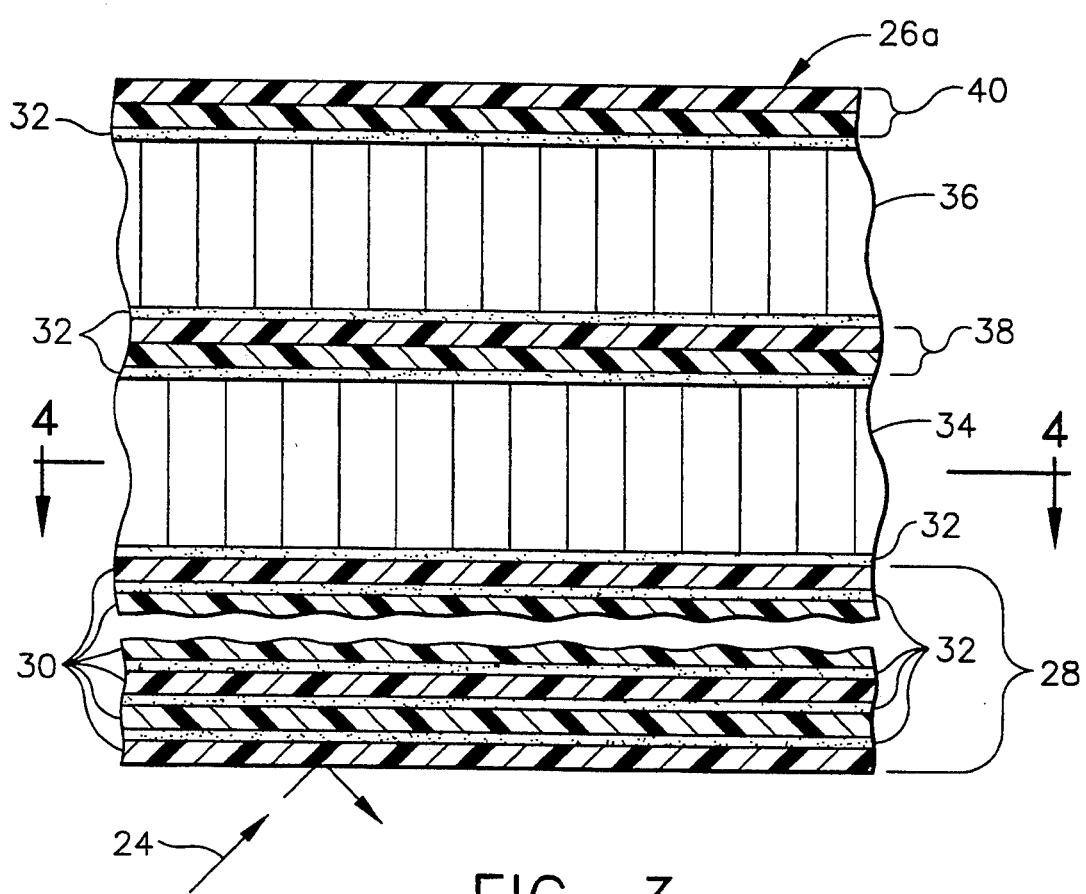
FIG. 3 is an enlarged partly sectional view of a portion of the impact liner illustrated in FIG. 2 taken along line 3—3.

More specifically, FIG. 3 illustrates in more particularity a radial section through the impact liner 26a illustrated in FIG. 2 showing the improved components thereof. In the preferred embodiment, the entire fan case liner 26, and in particular, the impact liner 26a is a composite article formed of several layers. The impact liner 26a in accordance with the present invention includes a multi-ply facesheet 28 at its radially inner diameter which faces radially inwardly in the fan case (see FIGS. 1 and 2) for providing a barrier for the impacting objects 24. The facesheet 28 includes a plurality of conventional laminates or layers 30 each having structural fibers or filaments therein bonded in a matrix to form a substantially rigid laminate 30. The structural fibers may include, for example, fiberglass or graphite fibers in a woven or cloth form and initially preimpregnated with a resin such as epoxy resin which upon conventional curing by heat and pressure forms the rigid laminate 30. The facesheet 28 in accordance with the present invention further includes a plurality of adhesive films 32 in the form of sheets or layers interleaved or disposed between and bonding together adjacent ones of the laminates 30. The facesheet 28 may be formed by interleaving the several laminates 30 with the adhesive films 32 therebetween and then curing the assembly thereof by suitable heat and pressure to form the finished facesheet 28 as a substantially rigid structure.

In accordance with the invention, the adhesive film 32 is a toughened adhesive film which is different than the epoxy matrix binding together the structural fibers of the laminates 30 and is considered tough relative thereto, with the epoxy matrix being relatively brittle relative thereto. In the preferred embodiment, the adhesive films 32 are preferably characterized by the absence of structural fiber reinforcement thereof for allowing elastic strain therein for dissipating impact energy upon impact by the objects 24.

The adhesive films 32 are also characterized by having a peel strength of greater than about 40 pounds per linear inch (pli), which is greater than about 7 kg/cm. Peel strength is a conventionally known characteristic and is obtained by bonding the adhesive to a substrate and then peeling the adhesive from the substrate to determine the required force per linear unit width required to break the bond. For example, a non-toughened adhesive has a substantially low peel strength of about 20-25 pli (3.6-4.5 kg/cm). In the preferred embodiment of the present invention, the adhesive film 32 has a peel strength within the range of about 60-80 pli (11-14 kg/cm) so that the cured facesheet 28 becomes relatively tough yet strong for dissipating the impact energy from the impacting objects 24 by elastic strain in the adhesive films 32 between the laminates 30.

In some tests conducted for ice impact resistance to simulate a gas turbine engine environment by firing a stream of ice pellets, an exemplary facesheet 28 was found to not only be impact resistant but, in fact, was dentless, with the impacting ice not visibly damaging the innermost laminate 30 being impacted by the ice. In other tests, ice velocity and duration were increased to determine ice damage thresholds. In contrast, a conventional facesheet formed of multi-plies of the laminates 30 themselves without the interleaved toughened adhesive films 32 did not have the toughness associated with the facesheet 28 of the invention, with the innermost laminate experiencing more damage by the impacting ice during the test at lower ice impacting velocities and durations.

Suitable toughened adhesive films 32 are sold under the designation "AF153-2" by the 3-M Company, or under the designation "EA9689" sold by the Dexter Hysol Company. Another suitable toughened adhesive film 32 is identified by the General Electric Company Specification No. A50TF197. Of course, any suitable toughened adhesive film either conventionally available or which may be developed may be used in the improved facesheet 28 described above.

Due to the toughened facesheet 28, it has been determined in accordance with the present invention that the facesheet 28 itself may be made thicker than conventional nontoughened facesheets, so that further weight may be removed from the structure supporting the facesheet 28 itself for reducing the overall weight of the entire impact liner 26a.

Figure 4:
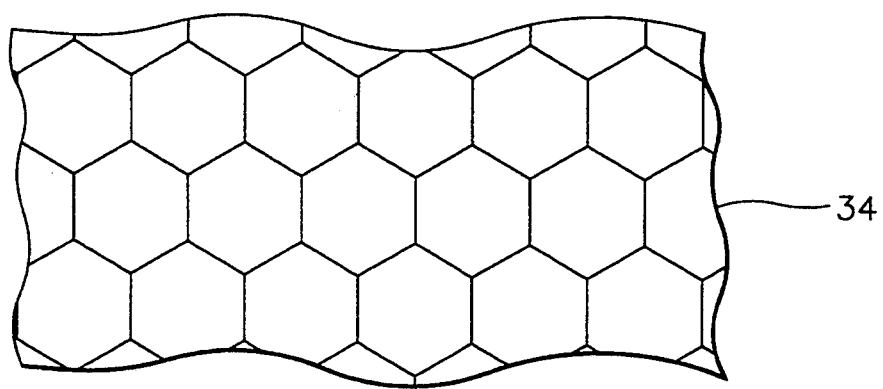
FIG. 4 is a transverse sectional view through a honeycomb layer of the impact liner illustrated in FIG. 3 and taken along line 4—4.

More specifically, the impact liner 26a further includes a conventional first support core 34, and another adhesive film which may be a conventional non-toughened film, or toughened like one of the toughened adhesives films 32 is disposed between and bonds together the facesheet 28 and the first support core 34 as shown in FIG. 3. The first support core 34 may take any conventional form including the honeycomb configuration illustrated in the preferred embodiment in FIGS. 2–4, or, alternatively, could be a solid core of foamed epoxy, for example, or a suitable frame, or egg crate-type structure. The first core 34 may have cells formed of conventional aluminum, or in the preferred embodiment illustrated in FIGS. 2–4, the honeycomb cells are formed of conventional aramid structural fibers, e.g., sold under the trademark "Nomex," in phenolic matrix to form a substantially rigid but lightweight core 34.

The toughened facesheet 28 allows the facesheet 28 to be made thicker than conventional facesheets with a corresponding weight or density reduction of the first core 34 to provide both improved impact resistance for the impact liner 26a while reducing the overall weight thereof. In several of many embodiments tested, the facesheet 28 had from about 8–11 plies of the laminates 30 with about 7–10 plies of the adhesive films 32 interleaved therebetween. This is in contrast to a conventional laminated facesheet without the toughened adhesive films therein which typically has about 3–6 plies of solely the structural laminates such as the laminates 30 described above.

In the embodiment of the invention illustrated in FIG. 3, the impact liner 26a further includes a conventional second support core 36 which may have a configuration similar to the various configurations of the first core 34 disclosed above, and in the preferred embodiment is also a honeycomb core formed of the lightweight aramid structural fibers in a suitable matrix. In order to provide possible further weight reduction, an intermediate structural first septum 38 is provided between the first and second cores 34 and 36 for reducing impact bending loads transmitted by the impacting objects 24 to the first and second cores 34, 36 through the facesheet 28. In the embodiment illustrated in FIG. 3, the first septum 38 has two plies of graphite fibers in an epoxy matrix forming a substantially rigid integral layer disposed between the first and second cores 34, 36, with additional respective ones of the toughened adhesive films 32 being disposed between and bonding together the radially inner side of the first septum 38 and the first core 34, and the radially outer side of the first septum 38 and the second core 36. Also in the embodiment illustrated in FIG. 3, a conventional backsheet 40 is disposed radially outwardly of the first core 34, and more specifically radially outwardly of the second core 36, and another one of the toughened adhesive films 32 is disposed between and bonds together the backsheet 40 and the second core 36. The backsheet 40 is also an integral two ply layer of graphite fibers in an epoxy matrix like the first septum 38.

The entire impact liner 26a may be conventionally formed by assembling together in the order illustrated in FIG. 3 the facesheet 28, first core 34, first septum 38, second core 36 and backsheet 40, all being pre-cured, with the joining adhesive films 32, and subjecting the entire assembly to suitable heat and pressure for curing thereof to form the final impact liner 26a.

Since the facesheet 28 provides improved toughness and impact resistance for the impacting objects 24, it may be made relatively thick as described above, with the first and second cores 34 and 36 having reduced weight for reducing the overall weight of the entire impact liner 26a itself. Accordingly, the density of the first and second cores 34, 36 may be reduced, for example by increasing cell size and/or decreasing cell wall thickness, with a corresponding reduction in the conventionally known compressive strength thereof. However, an additional advantage due to the present invention as confirmed by tests is that significant impact resistance of the impact liner 26a may be obtained with the first core 34 having a first compressive strength, and the second core 36 disposed radially outwardly therefrom and further away from the facesheet 28 having a second compressive strength which is less than the first compressive strength, which is in contrast to the Clarke configuration described above in the Background Section wherein the second core layer has a compressive strength preferably greater than that of the first core layer therein.

Since the impact liner 26a portion of the integrated fan case liner 26 is configured for impact resistance, the facesheet 28 thereof is preferably iraperforate as illustrated in FIGS. 2 and 3. However, since the facesheet 28 is preferably made thicker than a conventional facesheet, it may, alternatively, include perforations therein for providing additional sound suppression to further quiet the engine 10. As shown in FIG. 2 however, sound suppression is preferably provided by the sound suppression liner 26b extending downstream from the impact liner 26a for suppressing the sound generated by the fan 12 during operation. The sound suppression liner 26b is preferably integral with the impact liner 26a, with the facesheet 28 having an integral extension 28b forming the facesheet for the liner 26b which includes a plurality of conventional perforations therein for providing sound suppression.

The facesheet extension 28b may have fewer layers of the laminates 30 and adhesive films 32 (shown in FIG. 3) if desired since the impact resistance strength thereof is not required for sound suppression, and a reduction in thickness of the facesheet extension 28b results in an additional reduction in weight of the entire fan case liner 26. The sound suppression liner 26b conventionally includes a first support core 34b also in the form of a honeycomb, followed radially outwardly in turn by a second support core 36b, with a first septum 38b therebetween. The backsheet 40 includes an integral extension 40b surrounding the second support core 36b. Except for the use of the adhesive films 32 used in the sound suppression liner 26b, the liner 26b is otherwise conventional in configuration and function for suitably suppressing sound in the engine 10. Accordingly, the overall size and configuration of the fan case liner 26 illustrated in FIG. 2 may be substantially identical to conventional liners, but with improved impact resistance from the impact liner 26a with an overall reduction in weight of the entire liner 26.

Figure 5:
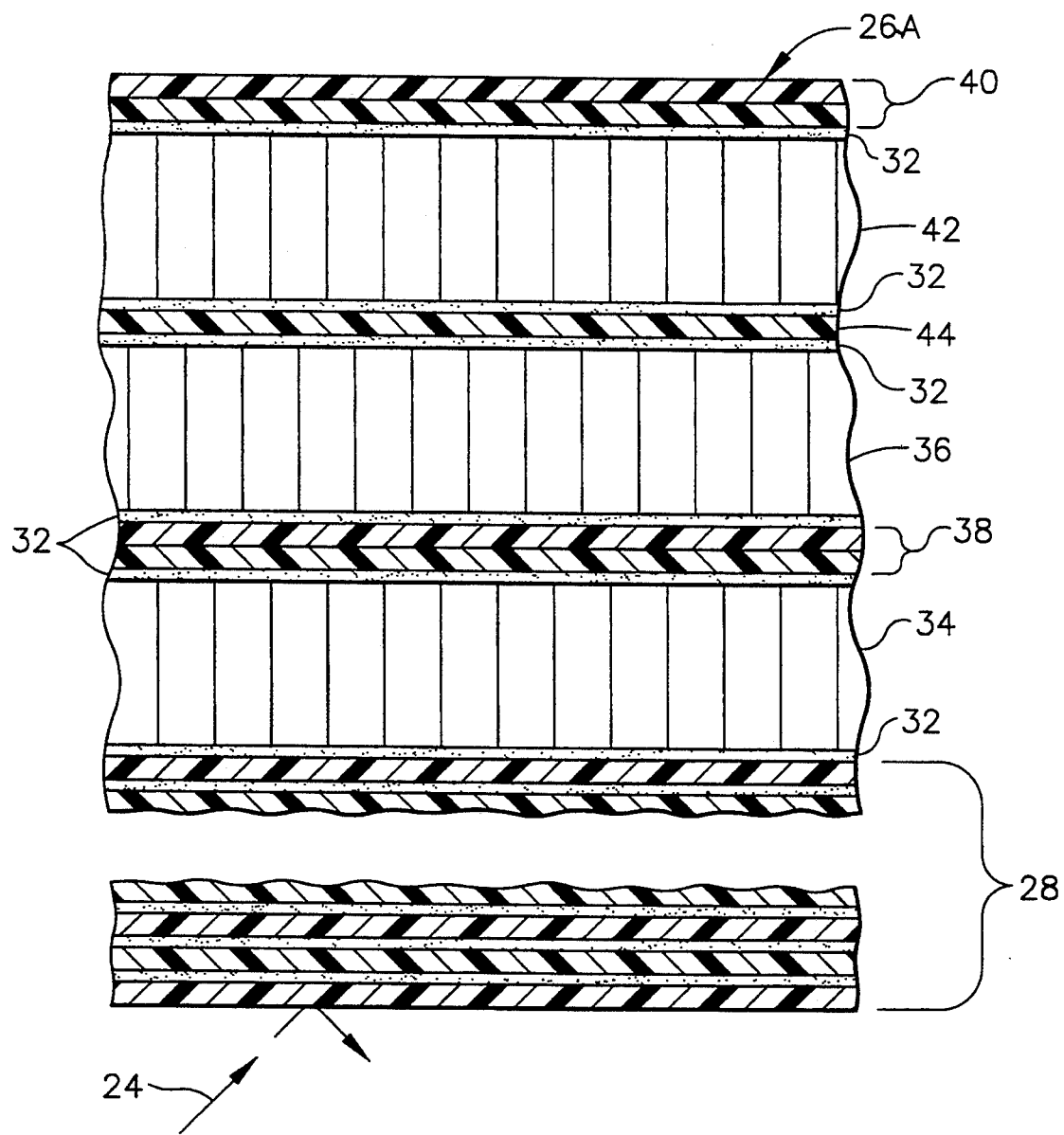
FIG. 5 is a partly sectional view of a portion of an impact liner in accordance with a second embodiment of the present invention similar to FIG. 3 for use in the fan case liner illustrated in FIG. 2.

Illustrated in FIG. 5 is another embodiment of the impact liner, designated 26A, which is substantially identical to the embodiment illustrated in FIG. 3 except that it includes a third support core 42 which preferably is an aramid fiber/matrix honeycomb similar to the first and second support cores 34, 36, and a second septum 44 disposed between the second and third cores 36, 42. Additional respective ones of the toughened adhesive films 32 are disposed between and bond together the inner surface of the second septum 44 and the second core 36, and the outer surface of the second septum 44 and the third core 42. The backsheet 40 is joined by the adhesive film 32 to the third core 42, instead of the second core 36 as in the FIG. 3 embodiment. The second septum 44 in the preferred embodiment is a single ply of fiberglass in an epoxy matrix, but, of course, it may have several plies of suitable structural fibers in a suitable matrix as desired.

As above described, the use of different support cores allows the impact liner 26a, 26A to be tailored for maximizing structural strength and impact resistance thereof while reducing overall weight. As indicated above, the first core 34 has a first compressive strength, the second core 36 has a second compressive strength, and the third core 42 has a third compressive strength, which may be equal to each other but less than compressive strengths of conventional impact liners; or may be different from each other for further reducing weight of the entire impact liner itself while maintaining enhanced impact resistance. As described above, the first core 34 or the core to which the facesheet 28 is attached preferably has the highest compressive strength which is greater than that of the second and third cores 36 and 42 spaced radially outwardly and further away from the facesheet 28. For example, the first core 34 is preferably conventionally configured to have a compressive strength of about 1,400 psi (98 kg/cm$^2$), with each of the second and third cores 36 and 42 being conventionally configured to have equal compressive strengths of about 200 psi (14 kg/cm$^2$). The corresponding weight densities of the first, seconds and third cores 34, 36, 42 in this exemplary embodiment are 9 pounds per cubic foot, 3 pounds per cubic foot, and 3 pounds per cubic foot (144, 48, 48 kg/m$^3$). In this configuration, the first core 34 has the highest density and therefore highest weight of the three cores, with the second and third cores 36, 42 having relatively low density and low weight cores for reducing the overall weight of the impact liner 26A while providing effective impact resistance by the facesheet 28 supported by the three cores in turn. In an alternate embodiment, the first, second, and third cores 34, 36, 42 may all be relatively low weight, low density cores having equal densities of about 3 pounds per cubic foot (48 kg/m$^3$) with equal compressive strengths of about 200 psi (14 kg/cm$^2$), for example.

Illustrated in FIG. 6 is yet another, simpler embodiment of the present invention wherein the fan case liner 26 includes the sound suppression liner 26b with an integral impact liner portion designated 26B which has only a single supporting core, i.e. the first support core 34. In this embodiment, the backsheet 40 is disposed radially outwardly of the first core 34 and joined thereto by the adhesive film 32. This embodiment is useful where the overall thickness of the impact liner 26a is relatively small which would then make any septum used therein relatively heavy. By eliminating the septum, its weight may be used instead in strengthening the core 34 to lower the overall cost of the liner 26 without weight gain due to the septum.

In all the above described embodiments, the interleaved composite facesheet 28 including the structural laminates 30 and the toughened adhesives films 32 therebetween provides an improved impact resistant article for dissipating energy from impacting foreign objects 24 such as ice thrown from the fan blades 14 in the gas turbine engine 10. The improved, toughened facesheet 28 provides a barrier to the foreign objects 24 which has been shown by tests to be truly dentless from ice impact for a simulated gas turbine engine environment. Although the several adhesive films 32 outside of the facesheet 28 itself may also be toughened, in alternate embodiments they may be any suitable and conventional adhesive as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the composite article of the present invention may be configured for use in other parts of the gas turbine engine where toughness is desirable.

Accordingly, what is desired to be secured by Letters Patent of the U.S. is the invention as defined and differentiated in the following claims:

We claim:

1. A fan case liner for a gas turbine engine comprising:

an integral facesheet including a plurality of laminates each having structural fibers bonded in a matrix, and a toughened adhesive film disposed between and bonding together adjacent ones of said laminates;

a first structural support core, and another adhesive film disposed between and bonding together said facesheet and said first core;

a second structural support core;

a first septum disposed between said first and second cores;

additional adhesive films disposed between and bonding together said first septum and said first core, and said first septum and said second core; and wherein said first core has a first compressive strength, and said second core has a second compressive strength less than said first compressive strength.

2. An linear according to claim 1 in the form of an annular fan case impact liner for a gas turbine engine adapted to be disposed downstream from a fan thereof, and wherein said facesheet faces radially inwardly for being impacted by foreign objects thrown from said fan during rotation thereof; said liner further comprising:

a backsheet disposed radially outwardly of said second core; and another adhesive film disposed between and bonding together said backsheet and said second core.

3. A liner according to claim 2 wherein said facesheet is imperforate.

4. A liner according to claim 2 in combination with a sound suppression linear extending downstream from said impact liner and formed integrally therewith for suppressing sound generated by said fan during operation.

5. A liner combination according to claim 4 further comprising:

a third structural support core;

a second septum disposed between said second and third cores;

additional adhesive films disposed between and bonding together said second septum and said second core, and said second septum and said third core; and said backsheet being joined by said adhesive film to said third core instead of said second core.

6. A linear combination according to claim 5 wherein said third core has a third compressive strength, said first compressive strength being greater than each of said second and third compressive strengths.

7. A liner combination according to claim 6 wherein said second compressive strength is substantially equal to said third compressive strength.

8. A liner combination according to claim 7 wherein all of said adhesive films are toughened and have a peel strength greater than about 7 kg/cm.

* * * * *